United States Patent
Waagen et al.

(10) Patent No.: US 8,433,741 B2
(45) Date of Patent: Apr. 30, 2013

(54) METHODS AND APPARATUS FOR SIGNATURE PREDICTION AND FEATURE LEVEL FUSION

(75) Inventors: Donald E. Waagen, Tucson, AZ (US); Samantha S. Livingston, Tucson, AZ (US); Nitesh N. Shah, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1335 days.

(21) Appl. No.: 12/133,938

(22) Filed: Jun. 5, 2008

(65) Prior Publication Data
US 2009/0292755 A1    Nov. 26, 2009

Related U.S. Application Data

(60) Provisional application No. 61/054,539, filed on May 20, 2008.

(51) Int. Cl.
*G06F 7/32*    (2006.01)
(52) U.S. Cl.
USPC .......................................... 708/520; 707/737
(58) Field of Classification Search .................. 708/520; 707/737
See application file for complete search history.

(56) References Cited

U.S. PATENT DOCUMENTS

| | | | |
|---|---|---|---|
| 6,452,596 B1 * | 9/2002 | Gueziec et al. | 345/440 |
| 2006/0010412 A1 * | 1/2006 | Teig et al. | 716/8 |

\* cited by examiner

*Primary Examiner* — Belix M Ortiz Ditren
(74) *Attorney, Agent, or Firm* — Eric A. Gifford

(57) ABSTRACT

A system for signature prediction and feature-level fusion of a target according to various aspects of the present invention includes a first sensing modality for providing a measured data set. The system further includes a processor receiving the measured data set and generating a first k-orthogonal spanning tree constructed from k orthogonal minimal spanning trees having no edge shared between the k minimal spanning trees to define a first data manifold.

A method for signature prediction and feature-level fusion of a target according to various aspects of the present invention includes generating a first manifold by developing a connected graph of data from a first sensing modality using a first k-orthogonal spanning tree, generating a second manifold by developing a second connected graph of data from a second sensing modality using a second k-orthogonal spanning tree, and aligning the first manifold and the second manifold to generate a joint-signature manifold in a common embedding space.

9 Claims, 3 Drawing Sheets

METHODS AND APPARATUS FOR SIGNATURE PREDICTION AND FEATURE LEVEL FUSION

CROSS-REFERENCES TO RELATED APPLICATIONS

This application claims the benefit of U.S. Provisional Patent Application No. 61/054,539, filed May 20, 2008, and incorporates the disclosure of the application by reference.

BACKGROUND

Generating meaningful joint sensor/signature manifolds includes generating a connected graph for subsequent eigen-processing and embedding. One technique for generating such a graph uses k-nearest-neighbor selection for defining adjacency. However, this technique is known to be sensitive to cyclic behavior, and for a small number of neighbors (k) in the graph, portions of the data often degenerate into null space. While this technique has been successful in an academic setting, it fails when it is applied in large real-world data sets whose individual signatures vary widely.

Nonlinear dimensionality reduction techniques operate under the assumption that Euclidean measures of similarity are meaningful locally, but not globally. Graphs provide a natural mathematical framework for nonlinear dimensionality reduction. Formally, a graph G consists of a pair of sets (V, E), where V is a set of vertices and E is a set of edges. The set of edges denote pairs of elements of V. A path P is an ordered sequence of vertices $v_1, v_2, \ldots, v_n$ with an edge $e_{jk}=(v_j, v_k) \subset E$ for all consecutive pairs of vertices in the ordered sequence, $e_k=(v_k, v_{k+1}) \subset E \ \forall v_k, v_{k+1} \subset P$. A graph G is connected if a path exists between every pair of vertices, $\exists P(v_k, v_j) \ \forall (v_k, v_j) \subset V$. Two vertices are adjacent, $v_n \sim v_k$, if an edge exists between them, $e_{jk}=(v_j, v_k) \subset E$.

An edge weight function w: V×V→R is a real-valued label associated with the edge, often representing the edge length or distance between the associated or adjacent vertices. Two common weight functions used on graphs are the simple nearest neighbor, Equation (1) and the Gaussian, or heat kernel, Equation (2):

$$w_{ij} = \begin{cases} 1 & v_i \sim v_j \\ 0 & \text{otherwise;} \end{cases} \quad (1)$$

$$w_{ij} = \begin{cases} e^{\frac{-|v_i-v_j|^2}{a}} & v_i \sim v_j \\ 0 & \text{otherwise.} \end{cases} \quad (2)$$

When applied to data, both of these functions can generate non-connected graphs for small k (where k is the limit on number of nearest neighbors to which these functions are applied; the k neighbors are selected in order of increasing distance) or small a, where a gives a physical scale for the heat-kernel approach to defining edge weights (Equation (2)). However, this problem is not detectable until the eigen-decomposition is computed, and the existence of a multiplicity of zero-valued eigenvalues indicates that the graph is not fully connected. The typical solution to this is to increase either k or a, which often results in suboptimal manifolds due to loss of local information, which destroys the ability of the dimensionality-reduction technique to retain the nonlinear characteristics of the original data.

The manifold alignment technique published by Ham (J. Ham et al., "Semisupervised Manifold Alignment," in R. Cowell and Z. Ghahramani (eds.), Proc. Of the Tenth International Workshop on Artificial Intelligence and Statistics, pp. 120-127, 2005) depends on the graph being completely connected. If the graph components are not connected, the sets of connected subgraphs would be defined in separate eigen systems, and map to each other's null-space by the process. The resultant embedding is meaningful only for a subset of the data. To avoid this problem and to ensure that all points are connected, k is increased to guarantee a connected graph. This leads to problems because the goal of the process is to preserve the local neighborhoods, which can be destroyed when k is large.

The idea of taking two disparate sensors and projecting them into a common space has been tried before (D. Marchette et al., "Comparing Apples & Oranges: Methods for Comparing the Incomparable," Hawaii International Conference on Statistics and Related Fields (2004)). This approach does not find the underlying manifold of the space first, leading to projections from high dimensions. Another way to execute feature-level fusion is to use joint probabilities and Bayesian networks (S. Ferrari et al., "Demining Sensor Modeling and Feature-Level Fusion by Bayesian Networks", IEEE Sensors Journal, Vol. 6 (2006)). This approach is problematic in high dimensions because the probabilities are not known and can only be roughly estimated. Feature fusion can also be done by combining features from different sensors into a single feature vector (U.S. Pat. No. 6,594,382, entitled "Neural Sensors" and Issued on Jul. 15, 2003, to Roger Woodall). But this approach suffers from high dimensionality, as well as from the problem of estimating meaningful scaling factors between the sensor-specific feature sets.

SUMMARY OF THE EMBODIMENTS

A system for generating a signature manifold of a data set according to various aspects of the present invention includes a first sensing modality for providing a measured data set. The system further includes a processor receiving the measured data set and generating a first k-orthogonal spanning tree constructed from k minimal spanning trees having no edge shared between the k minimal spanning trees to define a first data manifold.

A method for signature prediction and feature-level fusion of a target according to various aspects of the present invention includes generating a first manifold by developing a connected graph of data from a first sensing modality using a first k-orthogonal spanning tree, generating a second manifold by developing a second connected graph of data from a second sensing modality using a second k-orthogonal spanning tree, and aligning the first manifold and the second manifold to generate a joint-signature manifold in a common embedding space.

BRIEF DESCRIPTION OF THE DRAWING FIGURES

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTIONS OF EMBODIMENTS

Figure 1:
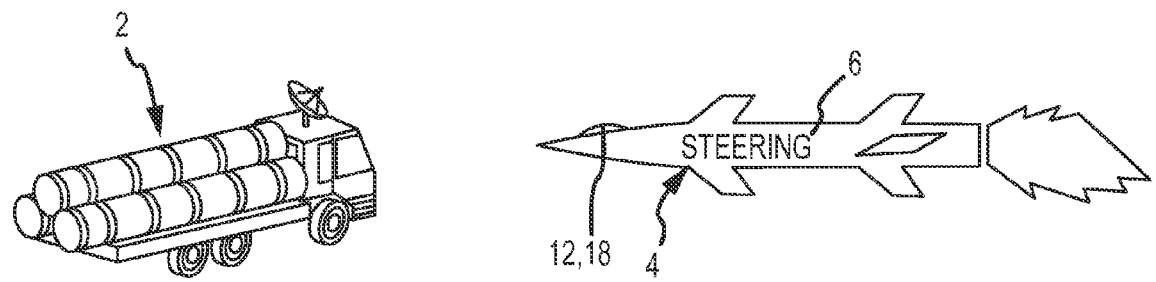
FIG. 1 is a missile seeker used in a sensor/target environment.

Surveillance and missile tracking systems can sense the environment using many different sensors, including infrared, video, radar, acoustic, and laser sensors, and are employed in various applications for target detection tracking classification, and in missile applications, disablement of targets. Identification and verification of the target are extremely important. Therefore, several sensors, typically of different modalities, are used in conjunction with each other. A common coordinate system may be generated to fuse features and predict signatures for a target using more than one sensing modality. FIG. 1 shows an example of a possible application for methods and apparatus according to various aspects of the present invention, including identifying a target 2 and steering a guided missile 4 to the target. The missile 4 may have multiple sensors 12, 18 that communicate with a steering system 6 to provide control signals that steer the missile 4 to the identified target 2. Data from the sensors 12, 18 are processed to aid in the identification and destruction of the target 2 by the missile 4. While various aspects of the present invention are described with reference to a particular illustrative embodiment, the invention is not limited to such embodiments, and additional modifications, applications, and embodiments may be implemented without departing from the present invention.

Various aspects of the present invention relate to characterizing the subspace spanned by data, and more particularly to a mathematical basis for feature-level fusion and signature prediction using manifold alignment applied to data from two or more sensing modalities. Graph-based techniques may be used to characterize the subspace spanned by data By aligning manifolds from different sensing modalities, a common coordinate system can be generated for feature fusion and cross-modality feature prediction as can be used in reconnaissance and weapon sensors. Sensing modalities may include, but are not limited to, video, infrared and radar.

Figure 2:
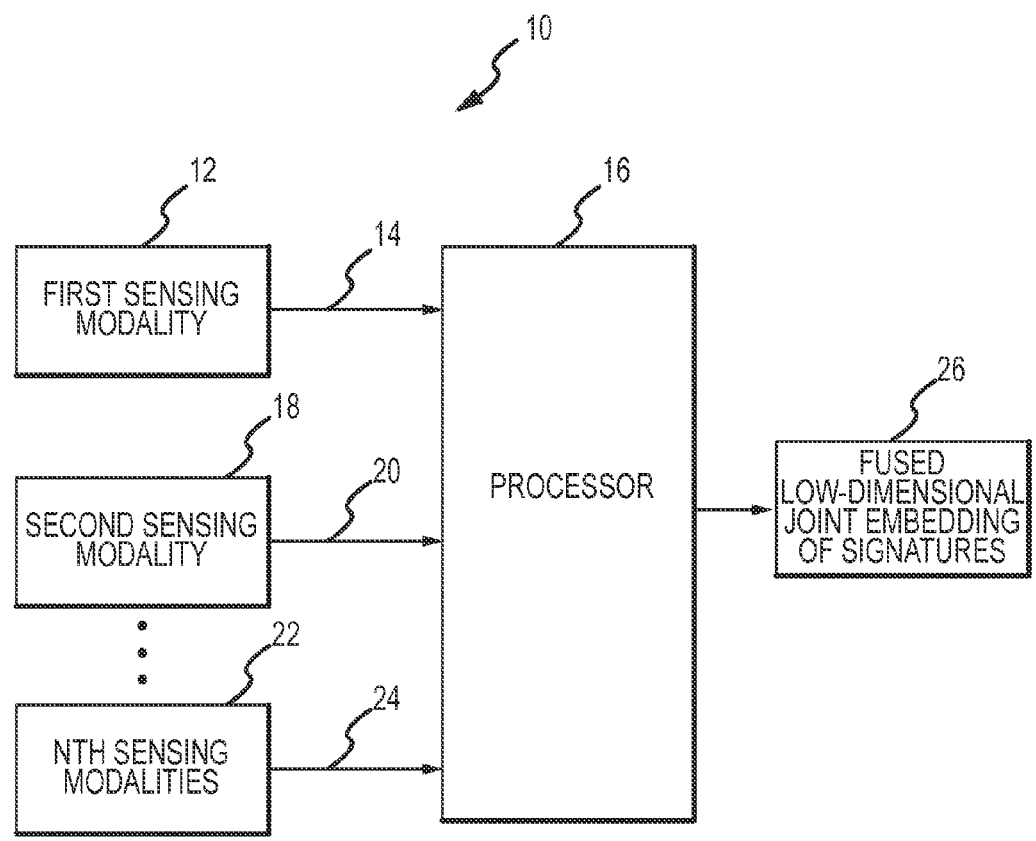
FIG. 2 is a block diagram of a signature prediction and feature level fusion system.

Referring to FIG. 2, a data fusion system 10 may be configured to generate a meaningful joint-sensor/signature manifold. A first sensing modality 12, such as a camera, provides a measured data set 14, such as target signature data, to a processor 16. The processor 16 generates a k-orthogonal spanning tree for the measured target signature data 14 of the first sensing modality 12. At least a second sensing modality 18 also provides a second measured data set 20 to the processor 16. The second sensing modality 18 may or may not be the same type as the first sensing modality 12. For example, the first sensing modality may be a camera providing target signature data relating to images and the second sensing modality may be a microphone providing target signature data relating to audio signals. Additional sensing modalities 22 and their measured data sets 24 may also be concurrently used.

The processor 16 processes each measured data set 14, 20 (and possibly 24), and generates separate k-orthogonal spanning trees for each of the input sets of target signature data, defining a first k-orthogonal spanning tree and at least a second k-orthogonal spanning tree. Neither the values for k nor the weight function need to be the same across the separate sensing modality Inputs. The processor 16 determines a graph Laplacian matrix for each of the separate graphs, providing a data-derived estimate of each sensor data's intrinsic manifold. The individual graph Laplacian matrices are combined into an overall matrix and the overall matrix is subjected to eigen-decomposition. Alignment may comprise deriving a fused low-dimensional joint embedding of signatures 26, also called a common coordinate system or a common embedding space, where certain pre-specified associated points in common across the multiple (at least two in this example) measured data sets are constrained to embed to the same coordinate.

Figure 3:
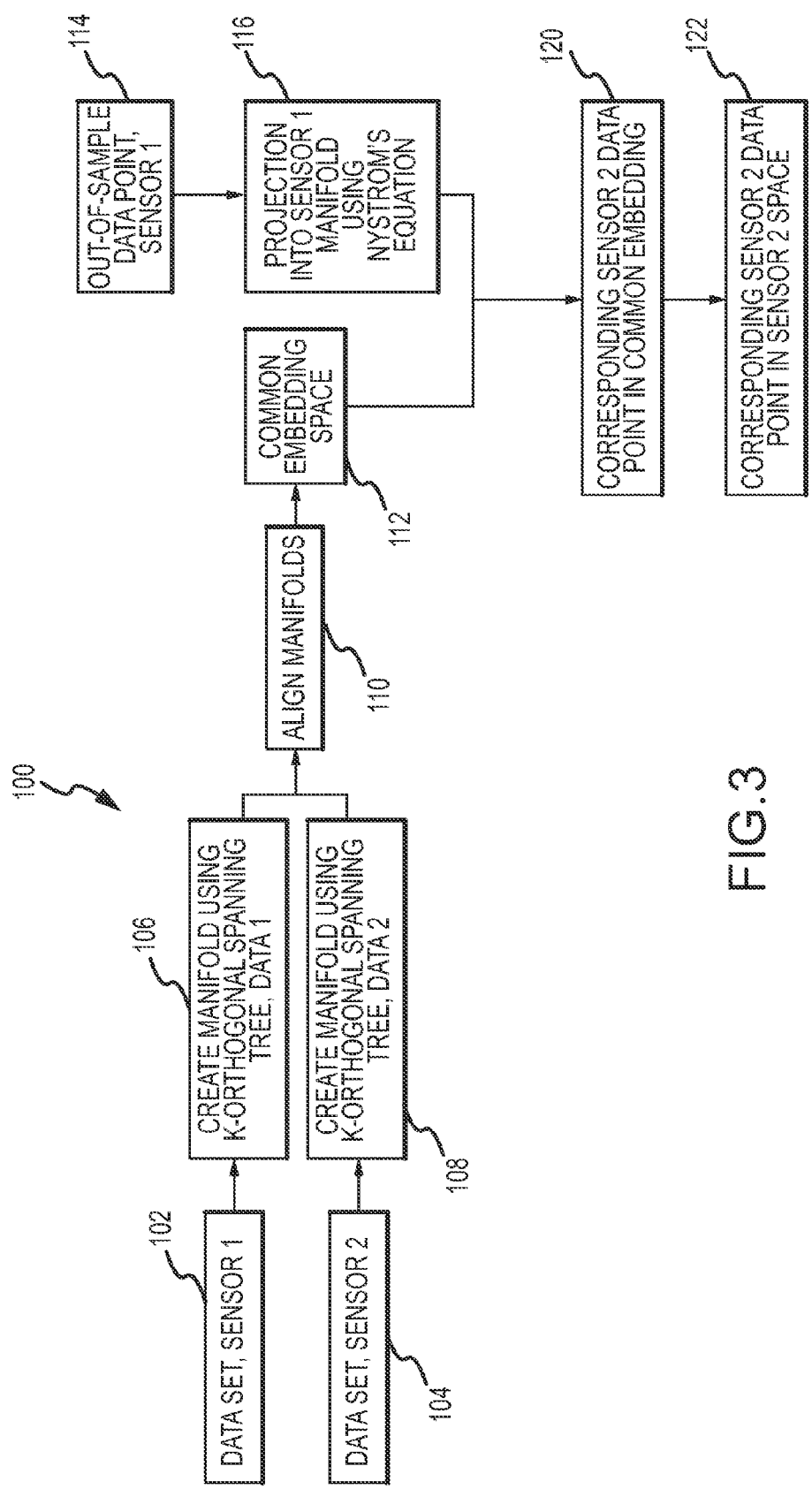
FIG. 3 is a flow chart of a method for signature prediction and feature level fusion.

Referring to FIG. 3, a method 100 according to various aspects of the present invention includes generating a joint-signature manifold for signature prediction and feature-level fusion for the case of two sensing modalities, measuring a new target signature measured using the first sensing modality, and translating the new first sensing modality target signature into the second sensing modality space. While the present exemplary embodiment relates to two sensing modalities, any number of sensing modalities may be used to build graphs and be embedded in a common space. A first sensing modality provides measures target signatures from a first sensor in a data set 102, and a connected graph manifold is built in a first sensing modality space using this data set and k-orthogonal spanning trees 106. A second sensing modality provides measured target signatures from a second sensor in a data set 104, and a connected graph manifold is built in a second sensing modality space using this data set and k-orthogonal spanning trees 108. The two separate graph manifolds are aligned 110, mapping all the data from the first sensing modality data set 102 and ail the data from the second sensing modality data set 104 to a common joint embedding space 112.

A new (out-of-sample) target signature 114 is measured by the first sensing modality. Using NyStröm's equation, the new target signature is projected 116 into the data manifold for the first sensing modality 106, and is assigned coordinates in the common embedding space 112. Since the two sensing modalities are co-aligned in the common embedding space, the target signatures corresponding to the second sensing modality 120 with similar coordinates are found. This information is backprojected into the original space associated with the second sensing modality 108, in effect providing a translation 122 of a target signature 114 from the first sensing modality space to a set of target signatures in the second sensing modality space predicting the target data.

Figure 4:
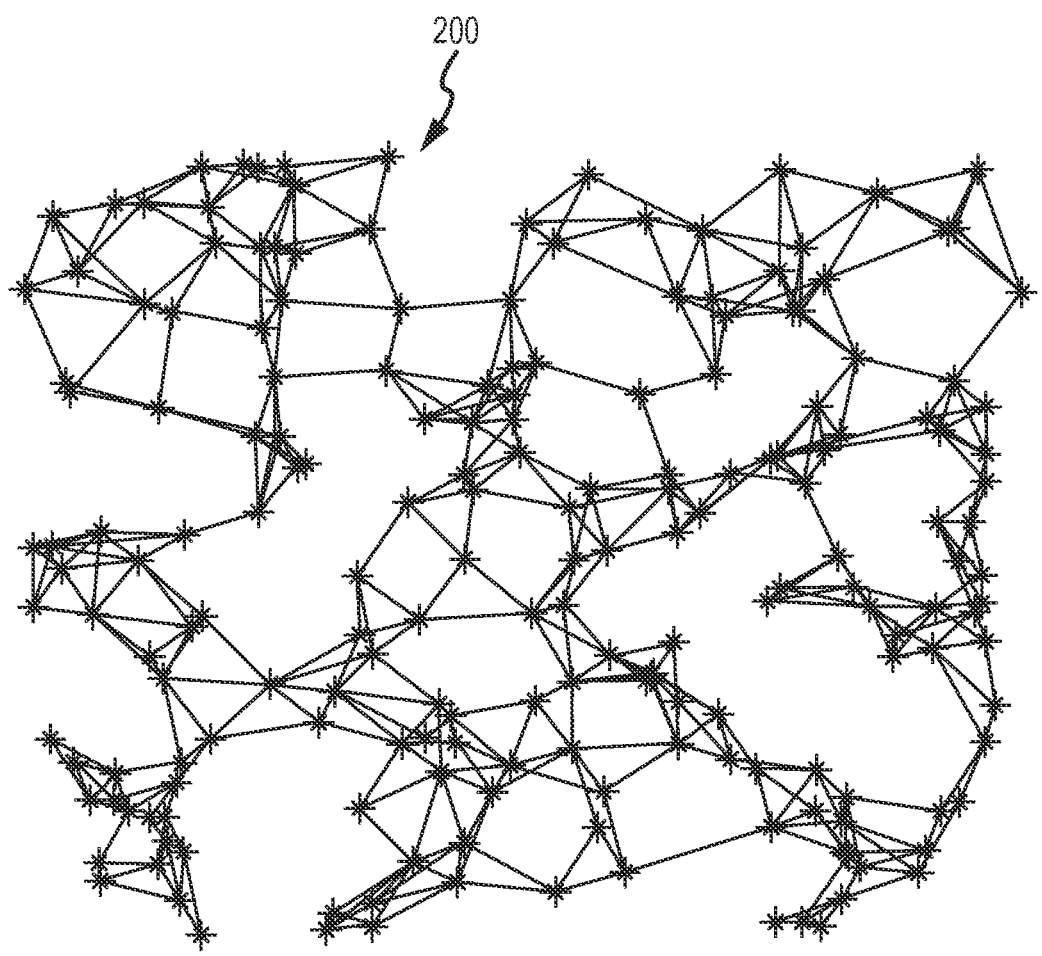
FIG. 4 is an example of a k-orthogonal minimal spanning tree.

Referring to FIG. 4, an exemplary k-orthogonal minimal spanning tree 200 comprises k minimal spanning trees, where no vertex is shared between the k graphs. In the present example, k=4. The k-orthogonal spanning tree is constructed through iterative calculation of a minimal spanning tree and removing all edges in the current tree from consideration in future trees. The result is the construction of a single connected graph, even when using small k, with no disjoint subgraphs.

Given edges defined by the k-orthogonal spanning tree computed on the data, a graph Laplacian matrix L(G) is defined in Equation (3) as:

$$L(G) = D - W. \qquad (3)$$

In Equation (3), D consists of a diagonal matrix with elements equal to the degrees of the vertices of G, i.e., $d_{ij}$=deg $(v_i)$, and W is the weight matrix of G, with elements $w_{ij}$. Specifically, the elements $l_{ij}$ of L(G) are given by:

$$l_{ij} = \begin{cases} deg(v_i) & \text{if } i = j \\ -w_{ij} & \text{if } v_i \sim v_j \\ 0 & \text{otherwise.} \end{cases} \quad (4)$$

In Equation (4) the degree of a vertex is given by the sum of its edge weights, $$deg(v_i) = \sum_j w_{ij}. \quad (5)$$

The graph Laplacian is, by construction, positive semi definite. A general eigenvector/eigenvalue problem can be constructed as follows:

$$Lg = \lambda Dg. \quad (6)$$

In the solution to Equation (6), the eigenvectors $g_1, g_2, \ldots, g_d$ corresponding to the smallest d nonzero eigenvalues $0 < \lambda_1 \leq \lambda_2 \leq \ldots \leq \lambda_d$ provide a natural mapping or embedding to a d-dimensional subspace. There is always at least one eigenvalue equal to zero, and all zero-valued eigenvalues may be ignored. Mapping may be accomplished by associating the j-th sample point to the j-th component of the eigenvectors as shown in Equation (7):

$$f: x_j \rightarrow (g_1(j), g_2(j), \ldots, g_d(j)). \quad (7)$$

Solving Equation (6) is equivalent to defining a real valued function on the graph $f: V \rightarrow R$ such that a cost function, Equation (8), is minimized. The functions $\{f_1, f_2, \ldots, f_d\}$ that minimize Equation (8) correspond to the eigenvectors of L as defined in Equation (7).

$$f^T L f = \frac{1}{2} \sum_{i,j} (f_j - f_i)^2 w_{ij} \quad (8)$$

The eigensystem of the graph Laplacian with an appropriate heat kernel, Equation (2), weight function can be analogous to diffusion processes on the graph and is directly related to a Laplace-Beltrami operator on manifolds Therefore, the eigensystem of the graph Laplacian provides a data-derived estimate of the data's manifold. Each sensing modality has a constructed graph that is fully connected and known as a manifold.

Referring again to FIG. 3, the present system may align the data sets 110, or manifolds 106, 108, derived for each sensing modality, or source, 102 and 104. Aligning the manifolds involves deriving a common embedding space 112 where certain points, called associated pairs (labeled points), are constrained to embed to the same coordinate for aligning the manifolds. This is similar to using control points to perform registration between two images. Though several input sensor data point sets may be used, the present example uses two sensing modality data point sets, X 102 and Y 104.

The sets of points X and Y are each organized into two disjoint subsets, l and u. The subset l contains labeled points and the subset it contains unlabeled points. Those points belonging to the labeled subset l of the set X have a corresponding point in the labeled subset l of the set Y. $L^X$ and $L^Y$ are the individual Laplacian matrices of the graphs defined on the sets X and Y. The graph Laplacian matrix $L^X$ can be decomposed as the following:

$$L^X = \begin{bmatrix} L^X_{ll} & L^X_{lu} \\ L^X_{ul} & L^X_{uu} \end{bmatrix}. \quad (9)$$

In Equation (9), the subscript l denotes point membership in the labeled set and the subscript u denotes point membership in the unlabeled set. There are three distinct combinations: (i) the subscript ll refers to connections between two labeled points; (ii) the subscript uu refers to connections between two unlabeled points; and (in) the subscript ln refers to connections between one labeled point and one unlabeled point. The fourth element, having subscript ul, is simply the transpose of the element having subscript lu, and thus provides no independent information. In analogy with Equation (9) for the graph Laplacian matrix $L^X$, the graph Laplacian matrix $L^Y$ can be decomposed as:

$$L^Y = \begin{bmatrix} L^Y_{ll} & L^Y_{lu} \\ L^Y_{ul} & L^Y_{uu} \end{bmatrix}. \quad (10)$$

Let $f$ and $g$ denote real-valued functions defined on X and Y respectively, A dual-embedding cost function, which is a generalization of Equation (8), is defined to be:

$$C(f, g) = \frac{\mu \sum_{i=1} |f_i - g_i|^2 + f^T L^Z f + g^T L^Z g}{f^T f + g^T g}. \quad (11)$$

The parameter $\mu$ controls the importance of co-locating the paired points, that is, $\mu \rightarrow \infty$ enforces $f_i = g_i$ for all $i \subset l$. In this limit, optimizing the C($f$, g) given in Equation (11) reduces to minimizing C(h) given by:

$$C(h) = \frac{h^T L^Z h}{h^T h}. \quad (12)$$

In Equation (12), h and $L^Z$ are defined by:

$$h = \begin{bmatrix} f_i = g_i \\ f_u \\ g_u \end{bmatrix}, L^Z = \begin{bmatrix} L^X_{ll} + L^Y_{ll} & L^X_{lu} & L^Y_{lu} \\ L^X_{ul} & L^X_{uu} & 0 \\ L^Y_{ul} & 0 & L^Y_{uu} \end{bmatrix}. \quad (13)$$

The eigenvectors $\{h_1, h_2, \ldots, h_d\}$ of $L^Z$ in Equation (13) associated with the d smallest positive eigenvalues provide the joint embedding coordinates for the sets X and Y. The subspace mapping is defined in Equation (7), but using functions h rather than functions g.

Unlike linear dimensionality reduction techniques, the coordinate system or embedding defined by a nonlinear dimensionality reduction technique is nonparametric in nature. For example, the subspace may be characterized by the eigenvectors/eigenvalues and the associated vertices or points which were used to define the eigensystem no model may be learned, rather the original points may be retained for subsequent processing of new data points. The projection of a new data point x info a low-dimensional subspace, such as is defined by Equation (7) for the cost functions defined by Equation (8) or Equation (12), is given by NyStröm's equation;

$$f(x)=[f_2(x),\ldots,f_d(x)] \quad (14)$$

and is defined as:

$$f_i(x) = \frac{1}{\lambda_i}\sum_{j=1}^{n} h_{ij}K(x, x_j). \quad (15)$$

In Equation (15), K is an appropriate kernel function which defines the similarity of the new point x with the n joint-sensor-space sample points $x_j$, j={1 ... n}. The Gaussian kernel (similar to Equation (2)) and nearest neighbor kernel (similar to Equation (1)) may be used as the kernel function K.

Appropriate application of equations (14) and (15) provides an effective approach for mapping new data points into the low-dimensional non-linear subspace, but care should be taken in use and interpretation of out-of-sample embedding for off-manifold points. Off-manifold (i.e. distant) points may embed (often to the origin, depending on the kernel), but the embedding is generally not meaningful.

By using k-orthogonal spanning trees as part, of the process for generating and then aligning the data manifolds from different, sensing modalities, the embodiment enables generation of a common coordinate system for feature fusion and cross-modality feature prediction. Given the joint embedding space and the target signatures embedded therein, it is possible to augment classification algorithms given test signatures obtained from the multiple sensors. Referring to FIG. 3, it is also possible to perform signature prediction, where data 114 (e.g., target-pose signature) measured in one sensing modality is used to predict the data 122 of the same object in the other sensing modality.

Using a common embedding space, also called a fused object signature manifold, for signature sets X and F from two heterogeneous co-aligned sensors, the concept of cross-sensor signature prediction reduces to an inference problem in the joint embedding space. The first and second data sets X and Y are mapped by way of h (see Equation (13)) into the common embedding space. Signature prediction can now comprise quantifying the nature of the other set in the neighborhood of the point in question.

Given points x ∈ X, y ∈ Y, and the k-dimensional joint embedding functions h={$h_1, h_2, \ldots, h_d$} (see Equation (13)), define:

$$D_h(x, y) = \sqrt{(h(x)-h(y))^Y(h(x)-h(y))}. \quad (16)$$

This is the Euclidean distance in the common embedding space, which should be meaningful in some neighborhood about a point on the manifold. Within the context of meaningful mappings (as discussed above with respect to off-manifold points), the mapping of object signatures between sensors is as simple as selecting the nearest neighbors in the other set.

Feature-level signature prediction can be accomplished by taking a set of signatures from a target object not represented in the training set or common embedding space, computing the embedding of the set using Equation (15), and in the subspace finding neighboring points belonging to the other sensor modalities. Then, for those neighboring points, go back to the original sensor data corresponding to those subspace points. These sensor data points give the neighborhood of signature translations predicted by the manifold-alignment technique.

The joint signature manifold alignment also enables feature-level fusion for classification. In a target classification system that, for illustrative example, uses concurrently operating video and radar sensing modalities, current methods Involve decision-level fusion. This method combines the results of two independent classifiers, one for video and one for radar. It is possible for the two classifiers to report different targets, for example a 'dog' from a classifier operating on the data from one sensor and a 'rock' from a classifier operating on data from another sensor, and the fusion algorithm would have no way to fuse these two classifications. According to the joint-signature manifold alignment of the embodiment, features from the video and radar sensors are combined before a classification is made. In the current example, the manifold alignment would be applied to both the video and the radar data, co-registering the data in the combined embedding space. Therefore, the features are the embedding space coordinates. A classifier is then applied in the embedding space and a single decision is made, for example either 'dog' or 'rock'. Only a single classification output is produced from the data from the two sensors. An advantage to the feature-level fusion of the embodiment is that deficiencies in one sensing modality can be compensated in the other sensing modality, leading to more robust results.

Systems and methods according to various aspects of the present invention may be adapted for signature prediction and feature-level fusion that allows a measured data set, target signatures measured by one sensing modality, to predict what a target will look like to another sensing modality, where the second sensing modality is not necessarily measuring the same physical properties as the first sensing modality, and to map features from heterogeneous sensing modalities into a common embedding space. The measured data set of target signatures, associated with a sensing modality, define a manifold, which is described using a graph generated by orthogonal spanning trees. The separate sensor-signature manifolds are then co-aligned and nonlinear dimensionality reduction is performed to derive a common embedding space where certain data from the different sensing modalities are constrained to embed to the same coordinate.

Orthogonal spanning trees are used to generate a connected graph that is used to align the manifolds from different sensing modalities. A minimal spanning tree is a connected graph with an associated minimal path length as defined by a weight function. A k-orthogonal spanning tree consists of k minimal spanning trees, where no edge is shared between the k graphs. The k-orthogonal spanning tree is constructed by iterative calculation of the minimal spanning tree and removing all edges in the current tree from consideration for future trees. In this way, connected graphs can be constructed using small k while still preserving nonlinear structural information.

By aligning the data manifolds from different sensing modalities, the present exemplary systems and methods generate a common coordinate system for feature fusion and cross-modality feature prediction. The present exemplary systems and methods may provide a robust approach for signature prediction and feature-level fusion that provides the generation of a connected graph to prevent degenerate mappings, even for small k or small a. The present systems and methods may also preserve nonlinear structural information that can be lost due to degenerate mappings. Additionally, target signatures that are not represented in the training set can be embedded into the common embedding space, and corresponding signatures from other sensing modalities can be estimated. Because the embodiments are able to preserve any nonlinear structural information as represented by the signature data, the relationship between novel signatures and the nonlinear embedding is retained, enhancing the meaningfulness of the resultant predicted signatures of other sensor modalities as defined by the common embedding space.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A method for signature prediction and feature-level fusion of a target, comprising:
generating a first manifold by developing a connected graph of data from a first sensing modality using a first k-orthogonal spanning tree;
generating at least a second manifold by developing a connected graph of data from at least a second sensing modality using a second k-orthogonal spanning tree; and
aligning the first manifold and the at least a second manifold to generate a joint-signature manifold in a common embedding space.

2. The method as claimed in claim 1, wherein generating the first and second manifolds by developing a connected graph of data comprises:
calculating k orthogonal minimal spanning trees by removing all edges in a current minimal spanning tree from consideration in subsequent minimal spanning trees to ensure no vertex is shared between the k minimal spanning trees.

3. The method as claimed in claim 2, wherein aligning the first manifold and the at least a second manifold further comprises deriving a common coordinate space with associated pairs of data in each of the first and second manifolds constrained to embed to the same coordinate.

4. The method as claimed in claim 3, further comprising augmenting a classification algorithm given test signatures in the joint-signature manifold.

5. The method as claimed in claim 3, further comprising predicting a signature of the target in the at least it second sensing modality using the joint-signature manifold and the first manifold.

6. The method as claimed in claim 5, further comprising comparing a set of signatures not represented in the joint-signature manifold to the joint-signature manifold to predict target signatures across the first and the at least a second sensing modalities.

7. The method as claimed in claim 6, further comprising:
mapping the first manifold into a common embedding space;
mapping the at least a second manifold into the common embedding space; and
mapping the target between the first and at least second manifolds.

8. A method for feature-level fusion of at least two sensing modalities, comprising:
developing a connected graph of feature data from a first sensing modality using a first k-orthogonal spanning tree to define a first manifold;
developing a connected graph of feature data from at least a second sensing modality using a second k-orthogonal spanning tree to define at least a second manifold;
aligning the first and at least a second manifold to define a common embedding space;
embedding an out-of-sample first sensing modality feature vector in the first manifold and the common embedding space;
embedding an out-of-sample second sensing modality feature vector in at least a second manifold and the common embedding space;
determining embedding space coordinates for the embedded out-of-sample feature vectors in the common embedding space;
applying a classifier to the embedded out-of-sample feature vectors from the embedding space coordinates.

9. The method as claimed in claim 7, further comprising:
projecting an out-of-sample first sensing modality feature vector in the first signature manifold;
finding a set of neighboring points for the out-of-sample feature vector in the common embedding space for the at least a second sensing modality; and
backprojecting the set of neighboring points into at least a second signature manifold;
wherein the backprojected set of neighboring feature vectors provides feature-level signature prediction for the at least a second sensing modality in the common embedding space.

* * * * *